Patented July 28, 1942

2,291,321

UNITED STATES PATENT OFFICE 2,291,321

CATALYTIC PRODUCTION OF WOOD PRESERVATIVE

Jacquelin E. Harvey, Jr., Cogdell, Ga., assignor of one-half to Southern Wood Preserving Company, East Point, Ga., a corporation of Georgia No Drawing. Application December 9, 1939, Serial No. 308,462

10 Claims. (Cl. 196—50)

The invention relates to the production of wood preservative from tars or derivatives or combinations thereof including refined or partially refined tars or tar fractions.

An object of the invention is to provide a process for the catalytic reforming or conversion of the materials named, which are not entirely suitable as a wood preservative, in such a manner as to provide therein an increased amount of material falling within any given specification for a wood preservative, be said specification what it may. As suggested any specification for a wood preservative derived from the materials named and effective in the wood preserving industry may be met by practice of the invention.

It is current practice in producing wood preservative from tars to distill off a given percentage and use the distillate for the purpose. A usual percentage of distillation from coal tar is 25% of the whole and is the accepted creosote of the trade. Removal of the percentage named results in production of great quantities of pitch which is a distress product, so much so as to greatly hamper the operation of manufacture. When it is attempted to secure a large percentage as for instance 65% to 70% of distillate to be used as a wood preservative, the material is for many purposes not usable, as is well understood in the art, for a number of reasons as for instance because the material has too high a residue. Increased recovery of the material of a low residue above 355° C. is very desirable.

By the process of the present invention tar fractions heretofore not desirable for use as a wood preservative are catalytically reformed or converted into a material suitable for such use. Examples of methods of practicing the invention are set forth in the following:

*Example 1.*—Coke oven tar is charged to a still and stripped of low boiling ends, say between 210° C. and 355° C., which is the usual creosote as at present used. When the cut named has been secured with the vapors delivered to a condenser, the vapors found in the remaining material are directed to a catalytic chamber heated from 200 to 600° C. and containing a catalyst.

A suitable catalyst may contain any one or a combination of tungsten, chromium, molybdenum, vanadium, silica, manganese, aluminum, copper or lead, and various earths or the like may be incorporated. The catalyst may advantageously be adsorbent, and may be prepared by starting with water soluble salts of the selected metal or metals which are deposited on an inert carrier. The metal may then be subsequently converted to sulphides or oxides or oxides may be reduced to provide a more efficient catalyst.

The flow of said high boiling vapors through the catalytic chamber is accompanied by from 1% to 20% of added gaseous material, as for instance, steam, methane, butane, hydrogen, various refractory gases or mixtures thereof. The flow of the high boiling vapors and added gaseous material through the chamber is controlled at from $\frac{1}{10}$ volume to 10 volumes of the combined vapors per volume of catalyst per hour.

The vapors issuing from the catalyst chamber when condensed will be found to represent at least 75% of the original high boiling vapors fed to the chamber, which condensate will be found to have an initial boiling point of at least 25° C. lower than that of the initial high boiling oil. The oil thus secured as a condensate and forming the desired wood preservative or part thereof will be found to have newly induced toxic characteristics and it is this increased toxicity of the material which comprises one of the important features of the present invention.

The catalyst will usually be found to remain sufficiently active to promote, direct, or produce the reforming action of the high boiling oils or vapors thereof during the treatment of a full charge of tar in the commercial tar still, but trials may show the desirability of providing two or more catalyst chambers with means for diverting the flow of the material from one thereof to another should the first-used chamber become fouled with, for instance, a carbonaceous increment to a point where operation ceases to be commercial, in other words, to a point where the reforming or converting action is too low or too slow.

Revivication of the catalyst may be effected in many ways, as, for instance, by burning off any carbonaceous increment on the catalyst in situ in the chamber with, if desired, subsequent reduction of the catalyst.

The newly induced low boiling oils as mentioned in the foregoing have a toxicity in excess of the oils from which they were formed, that is, the effect of passing vapors comprising tar fractions having an initial boiling point in excess of 355° C. with from 1% to 20% of the named gaseous substances, other than the tar vapors, through a chamber and over one of the named catalysts as a rate of $\frac{1}{10}$ volume to 10 volumes of the vapor per volume catalyst per hour reduces the initial boiling point, reduces the residue above 355° C. and results in a marked increase of toxicity of the material.

It will be found that deposit of carbonaceous material on the catalyst is somewhat dependent upon operating conditions and by proper coordination of temperature, flow and supply of extraneous gaseous material it is possible to control the said deposit to be as low as .05% or lower of the material treated. It is believed that the degree or amount of said carbonaceous deposit on the catalysts has to some extent or in some way an influence on the resulting increase of the toxicity of the newly formed oils. The foregoing example of an embodiment of the invention is illustrative only. For instance fractions having an initial boiling point other than 355° C., more or less, may be put in vaprous phase and subjected to the catalytic action segregated from other fractions of the parent tar.

The present invention therefore broadly includes the inducing of toxicity by acting upon fractions as described in the vaprous phase, submitting the same to catalytic action for a sufficient period of time. It is impossible to state necessary conditions of pressure, heat and time arbitrarily because of the wide variation of the character of usable starting material.

Pressures from atmospheric upward are usable. Other things being equal, it is advisable to increase the pressure above atmospheric as the operating temperature is raised. Proper coordination of temperature and pressure upon a given starting feed is found by a few trials and the pressure and temperature which will give a product of lowered specific gravity and enhanced toxicity without inordinate production of permanent gases may readily be determined. The present invention is, as already stated, largely concerned with inducing toxicity in tar or tar fractions having a deficiency thereof.

In the example above given the vapors of the entire starting material may be subjected to the catalytic treatment instead of only the vapors of high boiling fractions, making possible the production of certain wood preservatives from certain tars by the passing of the material once through a catalyst chamber and the collection and condensation of the entire delivered vapors separated from the excess gases for use as a wood preservative.

It will be noted that the gases named for use with the vapors of tar fractions are non-oxidizing in character.

In another phase of the invention the tar refined or crude and being deficient in toxicity for use as a wood preservative may be passed in liquid phase through a catalyst chamber containing the selected catalyst under conditions which induce toxicity and reform the material into a condition suitable for use as a wood preservative as illustrated by the following example:

Example 2.—A coke oven tar having a coke residue in excess of 10%, boiling less than 40% at 355° C. and having a deficiency of toxicity, is passed in the liquid phase through a catalyst chamber containing one or more of the catalysts selected from the above named group. The temperature is maintained at substantially 410° C. The flow of tar through the catalyst is accompanied by 4% methane. Pressure is held at substantially 30 atmospheres and the flow is regulated to substantially 1 volume per volume of catalyst per hour. The beneficiated tar separated from gaseous materials will be found to have more than 45% boiling at 355° C., coke residue of less than 10% and it will be found that toxicity is increased. In this instance carbonaceous deposition on the catalyst will be found to be substantially 1%.

In accordance with another phase of the invention selected fractions of any of the carbonaceous tars falling within a narrow range of boiling points are taken and subjected to the named toxicity inducing conditions. For instance, the chosen fractions of tars or creosotes may be treated which tend to salt out at lower temperatures. The application of the process of the invention to these fractions not only induces toxicity therein but they are at times found to have less tendency to salt out at lower temperatures as a result of the treatment.

The invention broadly contemplates the inducing of toxicity in tar or tar fractions by the passing of the same in the presence of from 1% to 20% of extraneous gaseous material over a catalyst, the rate of flow being from $\frac{1}{10}$ volume to 10 volumes per hour while heated to a temperature of from substantially 200 to 650° C. at atmospheric or superatmospheric pressure, the speed of flow, the temperature and the pressure being so coordinated as to induce toxicity, lower coke residue and specific gravity, while precluding an amount of carbonaceous deposit on the catalyst and/or an amount of production of permanent gases which would deleteriously affect the increase of toxicity of the beneficiated material.

Another possible set of conditions for treatment of a tar material is as follows:

Example 3.—Tar having a coke residue in excess of 10%, distilling substantially 35% at 355° C. and requiring in excess of 2% for total inhibition of wood destroying fungi is passed through the catalyst chamber containing an adsorbent catalyst chosen from the above named materials while in the presence of 5% of steam and maintained at a temperature of substantially 415° C. and a pressure of substantially 10 atmospheres, the rate of flow being substantially ½ volume charging material per volume catalyst per hour. After relieving the processed material of excess and dissolved gaseous material it will be found that toxicity has been introduced therein to such an extent that less than 2% will be required for total inhibition, and the coke residue is reduced to in the order of 7% and substantially more than 35% distilling at 355° C.

The above named conditions of temperature, pressure and rate of flow may be varied to increase the toxicity of the treated material upon the general principle that increase of pressure or temperature or both and a slower rate of flow through the catalyst chamber will increase the enhancement of toxicity at the same time improving the other elements of beneficiation.

Example 4.—A tar having a coke residue in excess of 10%, distilling substantially 30% at 355° C. and requiring substantially more than 2% for total inhibition is passed through the catalyst chamber wherein the catalyst consists substantially of adsorbent silica and alumina, the tarry material being mixed with 5% of an equal mixture of steam and methane. The pressure is held at substantially 15 atmospheres and temperature at 400° C. Flow is controlled at 2 volumes of feed per volume catalyst per hour.

The beneficiated material is freed of excess and dissolved gaseous products and led through a second catalyst chamber containing a catalyst of similar nature while mixed with 5% of steam, the flow being maintained at the rate of 1 volume feed per volume of catalyst per hour. The pressure in the second catalyst chamber is controlled at substantially 20 atmospheres and temperature at substantially 420° C.

The thus treated tar is freed from excess and dissolved gaseous material and will be found to require less than 1.7% for total inhibition of wood destroying fungi, to have a coke residue less than 8% and to distill more than 35% at 355° C.

As will be observed from the above example, the treatment of the material in a single catalyst chamber may be carried out as a recycling operation, preferably with separation of gases from the material after each pass and the adding of fresh gaseous material before the next pass and with the result of stepping up the toxicity and reducing the coke residue with a lowering of the boiling point at each pass.

The advantage of the procedure outlined in Example 4 is that the second pass may be carried out under different temperature and pressure conditions and if desirable over a more active catalyst.

Because tar, including tar products generally, is so sensitive to thermal decomposition, while practicing the present invention it is advantageous to heat it in such a manner prior to entry into the catalyst chamber that none of the material is heated to the decomposition point. Many methods of accomplishing this end will occur to those skilled in the art as for instance heating in a series of tubes set in a furnace, and if desired flowing the heated material through a tube or chamber containing broken earthenware or the like, whereby to further equalize the thermal input.

It is possible to heat the oil in thin films to secure the desired result.

*Example 5.*—A tar having in excess of 60% residue above 355° C., a coke residue in excess of 10%, and a viscosity too great for satisfactory wood impregnation is flowed through a catalyst chamber containing an adsorbent catalyst of the nature above described mixed with 3% of steam while maintaining a temperature of 380° C., a pressure of substantially 10 atmospheres and a feed rate of 1 volume feed per volume catalyst per hour. The tar flowing from the catalyst chamber and relieved of excess gaseous material is passed into a still where a cut up to 340° C. is removed. The residue with or without the addition of a suitable solvent to lower carbon value is recycled under substantially the same conditions, or if desired at a higher temperature to induce further newly formed wood preservative oil, and the material after the recycling is again subjected to the named stripping action.

In the practice of the invention generally the pressure, temperature, time and character of catalyst are so controlled that no greater percentage of low ends below 210° C. are produced than is acceptable in a desired wood preservative for the reason that such low ends must be stripped and discarded so far as wood preservative art is concerned in order to come within the specifications and therefore are a loss to the desired product.

Various wood preservative specifications allow different percentages boiling below 210° C. as for instance the current American Wood Preservative Association specifications specify not more than 5% boiling below 210° C. whereas Prussian State Railways published specifications allow 3% below 150° C.

By practice of the invention a starting material chosen from the materials named herein may be refined, modified, transformed, converted or treated in such a manner, embodying the principles herein outlined, as to provide a wood preserving oil of superior toxicity having lowered carbon content, viscosity, and residue above 355° C. and/or increase in the fractions in which toxicity is inordinately high.

*Example 6.*—Tar or fractions thereof not entirely acceptable as a wood preservative may be heated in a tube still through which the material is passed at such a speed as to prevent or minimize thermal decomposition. The temperature may, as an example, be 355° C. The heated material is then passed to a flash chamber where all volatile fractions are flashed and passed in the vapor phase to the catalytic chamber under controls selected from any one of the previous examples. The vapor will be transformed, converted, or modified by catalytic action so as to be found to have a toxicity of increased value over the parent material and a lowered coke residue with a viscosity which more readily lends itself to the penetration of the wood.

In some instances for the production of certain characteristics it may be decided to produce unwanted material boiling below 210° C. in which case the low boiling ends are stripped and discarded so far as the wood preservative is concerned.

Generally speaking a few trials are necessary with each different feed material to determine the conditions of treatment to bring the material within the toxicity value, boiling range, viscosity, specific gravity, and coke residue of given specifications for wood preservative, observing the variation caused in these elements by the various controls. For each selected feed there will be found to be a different latitude in the range of control which if exceeded will definitely change the character of the produced material.

As the process proceeds with a given batch of catalysts, the catalysts will become less active by fouling and as time goes on an increase of pressure and/or temperature may be brought about to at least partially compensate for the falling off of activity of the catalysts. Catalysts may be of any shape or form to provide maximum contact and/or absorption.

Generally speaking the most desirable conditions for the present invention are a temperature selected between the range of from 300 to 650° C., the presence of from 1% to 20% of added gaseous materials and a superatmospheric pressure, the time chosen in accordance with the desired result and under named conditions the process will be found to induce toxic properties into starting materials of low toxicity, and to lower the coke residue and to provide a lowered and desired boiling range. If desired, cracking conditions may be provided in the catalyst chamber.

By the process of the invention wood preservative may be produced having the characteristics of creosote mixed with coal tar in the proportions of from 1% creosote and 99% coal tar to 99% creosote and 1% coal tar so as to include any of the usual 80—20, 50—50, 20—80 creosote-coal tar solutions or, as indicated, any other percentages desired.

Various changes may be made within the scope of the appended claims without departing from the spirit of the invention.

I claim:

1. The process of producing wood preservative from tar fractions with increase of toxic properties of the material: which process comprises vaporizing at least a portion of said tar fractions and passing said vapors with added steam through a catalyst mass including a siliceous material, the while maintaining a temperature chosen between 300° C. and 650° C., condensing the vapors and separating from the condensed oil material any water present whereby to provide a converted oil of induced toxicity having inhibition to wood destroying fungi in excess of its parent material; and stripping from the thus treated material sufficient low boiling ends to leave as a residual an oil of the wood preserving type boiling not more than substantially 3% at 150° C.

2. The process of producing a wood preservative from tar fractions unsuitable for such use by reason of too great viscosity and a deficiency of toxic value, which comprises: vaporizing at least a portion of said tar fractions and passing said vapors with added steam through a toxicity inducing catalyst mass including a siliceous material; carrying on the process at a temperature chosen between 300° C. and 600° C., the while vaporizing the feed stock at a rate of $\frac{1}{10}$ to 10 volumes per volume catalyst per hour; condensing the vapors issuing from the catalyst mass and separating from the condensed oil material any water present whereby to provide a converted oil of induced toxicity having inhibition to wood destroying fungi in excess of its parent material.

3. The process of producing wood preservative from tar fractions initially deficient in toxic properties which comprises: vaporizing at least a portion of said tar fractions and passing said vapors with an amount of steam chosen from between 1% and 20% through a toxicity-inducing catalyst mass including a siliceous material, the while maintaining a temperature chosen between 300° C. and 650° C.; condensing the vapors and separating from the condensed oil material any water present whereby to provide a converted oil of induced toxicity having inhibition to wood destroying fungi in excess of its parent material.

4. The process of producing wood preservative from tar fractions with increase of toxic properties of the material: which process comprises vaporizing at least a portion of said tar fractions and passing said vapors with added steam and hydrocarbon gas through a catalyst mass including a siliceous material, the while maintaining a temperature chosen between 300° C. and 650° C., condensing the vapors and separating from the condensed oil material any water present whereby to provide a converted oil of induced toxicity having inhibition to wood destroying fungi in excess of its parent material.

5. The process of producing wood preservative from tar fractions with increase of toxic properties of the material: which process comprises vaporizing at least a portion of said tar fractions and passing said vapors with added hydrocarbon gas through a catalyst mass including a siliceous material, the while maintaining a temperature chosen between 300° C. and 650° C., condensing the vapors and separating from the condensed oil material any water present whereby to provide a converted oil of induced toxicity having inhibition to wood destroying fungi in excess of its parent material; and stripping from the thus treated material sufficient low boiling ends to leave as a residual an oil of the wood preserving type boiling not more than substantially 3% at 150° C.

6. The process of producing a wood preservative from tar fractions unsuitable for such use by reason of too great viscosity and a deficiency of toxic value, which comprises: vaporizing at least a portion of said tar fractions and passing said vapors with added hydrocarbon gas through a toxicity inducing catalyst mass including a siliceous material; carrying on the process at a temperature chosen between 300° C. and 600° C., the while vaporizing the feed stock at a rate of $\frac{1}{10}$ to 10 volumes per volume catalyst per hour; condensing the vapors issuing from the catalyst mass and separating from the condensed oil material any water present whereby to provide a converted oil of induced toxicity having inhibition to wood destroying fungi in excess of its parent material.

7. The process of producing a wood preservative with toxic properties induced in the course of the process, which comprises: passing tar fractions having an end point in excess of 355° C. through a reaction chamber in the presence of hydrocarbon gas whilst contacting a catalytic mass including a siliceous material, at a temperature chosen between 300° C. and 650° C.; relieving the treated tar fractions of any dissolved gaseous material whereby to provide converted tar fractions of induced toxicity having inhibition to wood destroying fungi in excess of its parent material.

8. The process of producing a wood preservative with toxic properties induced in the course of the process, which comprises: passing tar fractions having an end point in excess of 355° C. in the liquid phase through a reaction chamber in the presence of steam, whilst contacting a catalytic mass including a siliceous material, at a temperature chosen between 300° C. and 650° C.; relieving the treated tar fractions of any dissolved gaseous material whereby to provide converted tar fractions of induced toxicity having inhibition to wood destroying fungi in excess of its parent material.

9. The process of producing a wood preservative with toxic properties induced in the course of the process, which comprises: passing tar fractions having an end point in excess of 355° C. through a reaction chamber in the presence of hydrocarbon gas whilst contacting a catalytic mass including a siliceous material, at a temperature chosen between 300° C. and 650° C.; relieving the treated tar fractions of any dissolved gaseous material whereby to provide converted tar fractions of induced toxicity having inhibition to wood destroying fungi in excess of its parent material; and stripping from the thus treated material sufficient low boiling ends to leave as a residual an oil of the wood preserving type boiling not more than substantially 3% at 150° C.

10. The process of producing a wood preservative with toxic properties induced in the course of the process, which comprises: passing tar fractions having an end point in excess of 355° C. in the liquid phase, through a reaction chamber in the presence of steam, whilst contacting a catalytic mass including a siliceous material, at a temperature chosen between 300° C. and 650° C.; relieving the treated tar fractions of any dissolved gaseous material whereby to provide converted tar fractions of induced toxicity having inhibition to wood destroying fungi in excess of its parent material; and stripping from the thus treated material sufficient low boiling ends to leave as a residual an oil of the wood preserving type boiling not more than substantially 3% at 150° C.

JACQUELIN E. HARVEY, JR.